(12) United States Patent
Buttolo et al.

(10) Patent No.: US 10,321,550 B2
(45) Date of Patent: Jun. 11, 2019

(54) ILLUMINATED VEHICLE BADGE

(71) Applicant: Ford Global Technologies, LLC, Dearborn, MI (US)

(72) Inventors: Pietro Buttolo, Dearborn Heights, MI (US); Stuart C. Salter, White Lake, MI (US); Paul Kenneth Dellock, Northville, MI (US); James J. Surman, Clinton Township, MI (US); James Stewart Rankin, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/040,989

(22) Filed: Jul. 20, 2018

(65) Prior Publication Data
US 2018/0332694 A1 Nov. 15, 2018

Related U.S. Application Data

(63) Continuation of application No. 15/151,543, filed on May 11, 2016, now Pat. No. 10,064,259.

(51) Int. Cl.
| | |
|---|---|
| H05B 37/02 | (2006.01) |
| H05B 33/08 | (2006.01) |
| B60R 13/00 | (2006.01) |
| B60Q 1/26 | (2006.01) |
| B60Q 3/80 | (2017.01) |
| B60Q 1/00 | (2006.01) |
| F21V 3/00 | (2015.01) |

(52) U.S. Cl.
CPC ....... *H05B 37/0281* (2013.01); *B60Q 1/0088* (2013.01); *B60Q 1/26* (2013.01); *B60Q 1/2619* (2013.01); *B60Q 3/80* (2017.02); *B60R 13/005* (2013.01); *F21V 3/00* (2013.01)

(58) Field of Classification Search
None
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,434,013 A | 7/1995 | Fernandez | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Dedei K Hammond
(74) *Attorney, Agent, or Firm* — Vichit Chea; Price Heneveld LLP

(57) ABSTRACT

A vehicle badge is provided herein that includes one or more light sources emanating emitted light through a viewable portion. The badge also includes a controller configured to adjust at least one of an intensity or a color of the emitted light. An electric current signal value is independently output to each of the one or more light sources and is configured to alter the intensity or the color of emitted light from the one or more light sources in a linearly perceived illumination pattern.

16 Claims, 13 Drawing Sheets

(56) References Cited

U.S. PATENT DOCUMENTS

| | | |
|---|---|---|
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,825 B2 | 3/2006 | Callahan |
| 7,015,893 B2 | 3/2006 | Li et al. |
| 7,161,472 B2 | 1/2007 | Strumolo et al. |
| 7,178,941 B2 | 2/2007 | Roberge et al. |
| 7,202,607 B2 | 4/2007 | Kazar et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 3,317,329 A1 | 11/2012 | Seder et al. |
| 8,317,359 B2 | 11/2012 | Harbers et al. |
| 8,330,383 B2 | 12/2012 | Man et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,721,121 B1 | 5/2014 | Briles |
| 8,724,054 B2 | 5/2014 | Jones |
| 8,754,426 B2 | 6/2014 | Marx et al. |
| 8,773,012 B2 | 7/2014 | Ryu et al. |
| 8,816,586 B2 | 8/2014 | Marcove et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,113,513 B1 | 8/2015 | Jungwirth |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0033676 A1 | 3/2002 | Harada |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2005/0275626 A1 | 12/2005 | Mueller et al. |
| 2006/0083015 A1 | 4/2006 | Yamazaki |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0090766 A1* | 4/2007 | LaGrave .............. H05B 39/047 |
| | | 315/82 |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2008/0211415 A1 | 9/2008 | Altamura |
| 2009/0015166 A1 | 1/2009 | Kwon |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0084995 A1 | 4/2010 | Baaijens et al. |
| 2010/0102736 A1 | 4/2010 | Hessling |
| 2011/0012062 A1 | 1/2011 | Agrawal et al. |
| 2011/0068689 A1 | 3/2011 | Scenini et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0256543 A1* | 10/2012 | Marcove .............. B60Q 1/2607 |
| | | 315/77 |
| 2012/0280528 A1 | 11/2012 | Dellock et al. |
| 2013/0050979 A1 | 2/2013 | Van De Ven et al. |
| 2013/0088171 A1 | 4/2013 | Fensore |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0217921 A1 | 8/2014 | Yang et al. |
| 2014/0239848 A1 | 8/2014 | Bradford |
| 2014/0264396 A1 | 9/2014 | Lowenthal et al. |
| 2014/0266666 A1 | 9/2014 | Habibi |
| 2014/0293038 A1 | 10/2014 | Delmonico et al. |
| 2014/0300284 A1 | 10/2014 | Lee |
| 2014/0340886 A1 | 11/2014 | Deutsch |
| 2014/0373898 A1 | 12/2014 | Rogers et al. |
| 2015/0003047 A1 | 1/2015 | Lin |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0138809 A1 | 5/2015 | Salter et al. |

(56) References Cited

U.S. PATENT DOCUMENTS

| | | |
|---|---|---|
| 2015/0245438 A1 | 8/2015 | Tyrrell |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| EP | 2827250 A2 | 1/2015 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

ILLUMINATED VEHICLE BADGE

CROSS-REFERENCE TO RELATED APPLICATION

This application is a continuation of U.S. patent application Ser. No. 15/151,543 entitled "ILLUMINATED VEHICLE BADGE," filed on May 11, 2016, now U.S. Pat. No. 10,064,259, the entire disclosure of which is incorporated herein by reference.

FIELD OF THE DISCLOSURE

The present disclosure generally relates to vehicle badges, and more particularly, to vehicle badges operable to illuminate.

BACKGROUND OF THE DISCLOSURE

Some vehicle badges employ a number of light sources to effectuate a variety of lighting effects. As such, a need arises to improve the illumination of said badges.

SUMMARY OF THE DISCLOSURE

According to one aspect of the present disclosure, a vehicle badge is provided herein. The vehicle badge includes one or more light sources emanating emitted light through a viewable portion. The vehicle badge also includes a controller configured to adjust at least one of an intensity or a color of the emitted light. An electric current signal value is independently output to each of the one or more light sources and is configured to alter the intensity or the color of emitted light from the one or more light sources in a linearly perceived illumination pattern.

According to another aspect of the present disclosure, a vehicle badge is provided herein. The vehicle badge includes one or more light sources configured to emit light through a viewable portion. The vehicle badge further includes a controller configured to linearly adjust amongst varying color hues emitted from the one or more light sources. A decorative layer is disposed in front of the one or more light sources configured to control or modify an appearance of a viewable portion.

According to yet another aspect of the present disclosure, a vehicle badge is provided herein. The vehicle badge includes a light source emanating emitted light through a viewable portion. The vehicle badge further includes a controller configured to adjust an intensity of the emitted light. An electric current signal value is output to the light source to alter the intensity of emitted light from the light source in a linearly perceived illumination pattern.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure is related to an illuminated badge that may be attached to a vehicle. The badge is configured to illuminate in predefined sequences to further refine the viewing experience of the vehicle the badge is adhered to.

Figure 1:
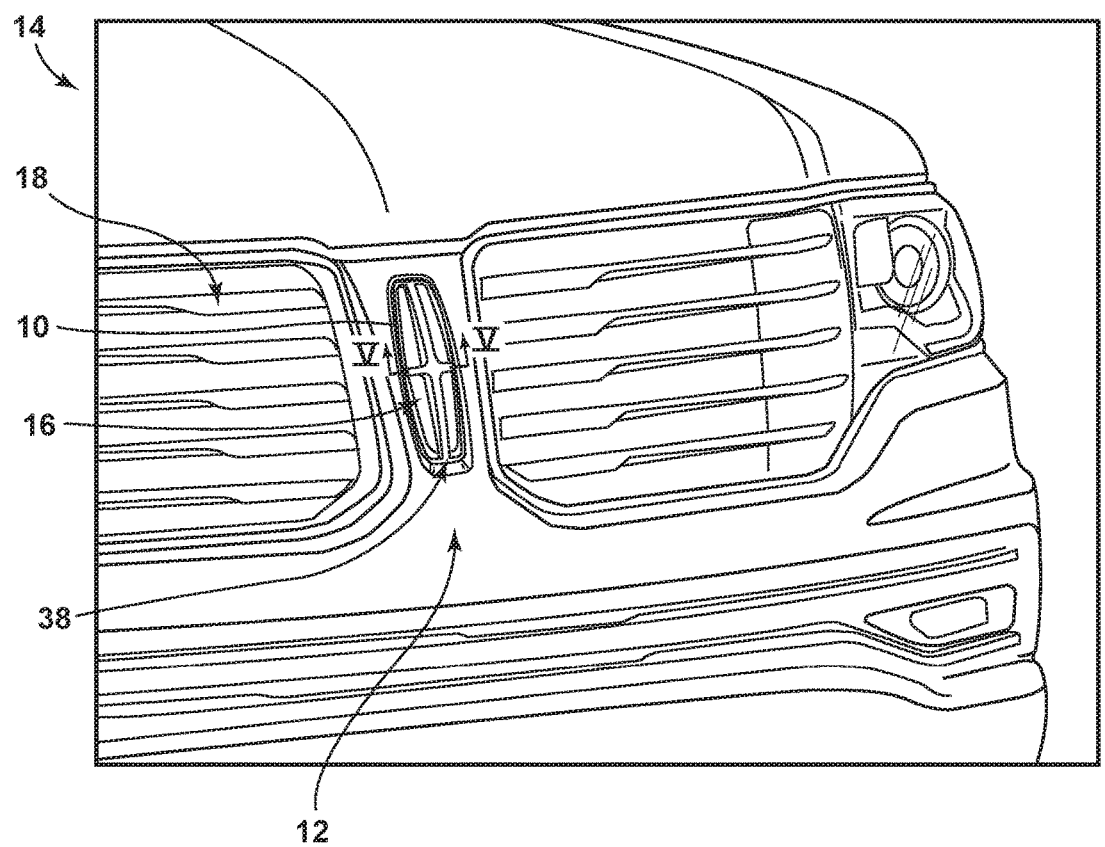
FIG. 1 is a front perspective view of a vehicle equipped with an illuminated badge on a grille assembly of a vehicle, according to one embodiment.

Referring now to FIG. 1, a badge 10 is generally shown mounted on a front portion 12 of a vehicle 14. In other embodiments, the badge 10 may be located elsewhere, such as, but not limited to, other locations of the front portion 12, a side portion, or a rear portion of the vehicle 14. Alternatively, the badge 10 may be disposed inside the vehicle 14. The badge 10 may be configured as an insignia that is presented as an identifying mark of a vehicle manufacturer and includes a viewable portion 16 that is generally prominently displayed on the vehicle 14.

In the presently illustrated embodiment, the badge 10 is centrally located on a grille assembly 18 of the vehicle 14, thus allowing the badge 10 to be readily viewed by an observer looking head-on at the vehicle 14. As will be described below in greater detail, one or more light sources may be disposed within the badge 10 and may illuminate portions of the viewable portion 16 to provide a distinct styling element to the vehicle 14.

Figure 2:
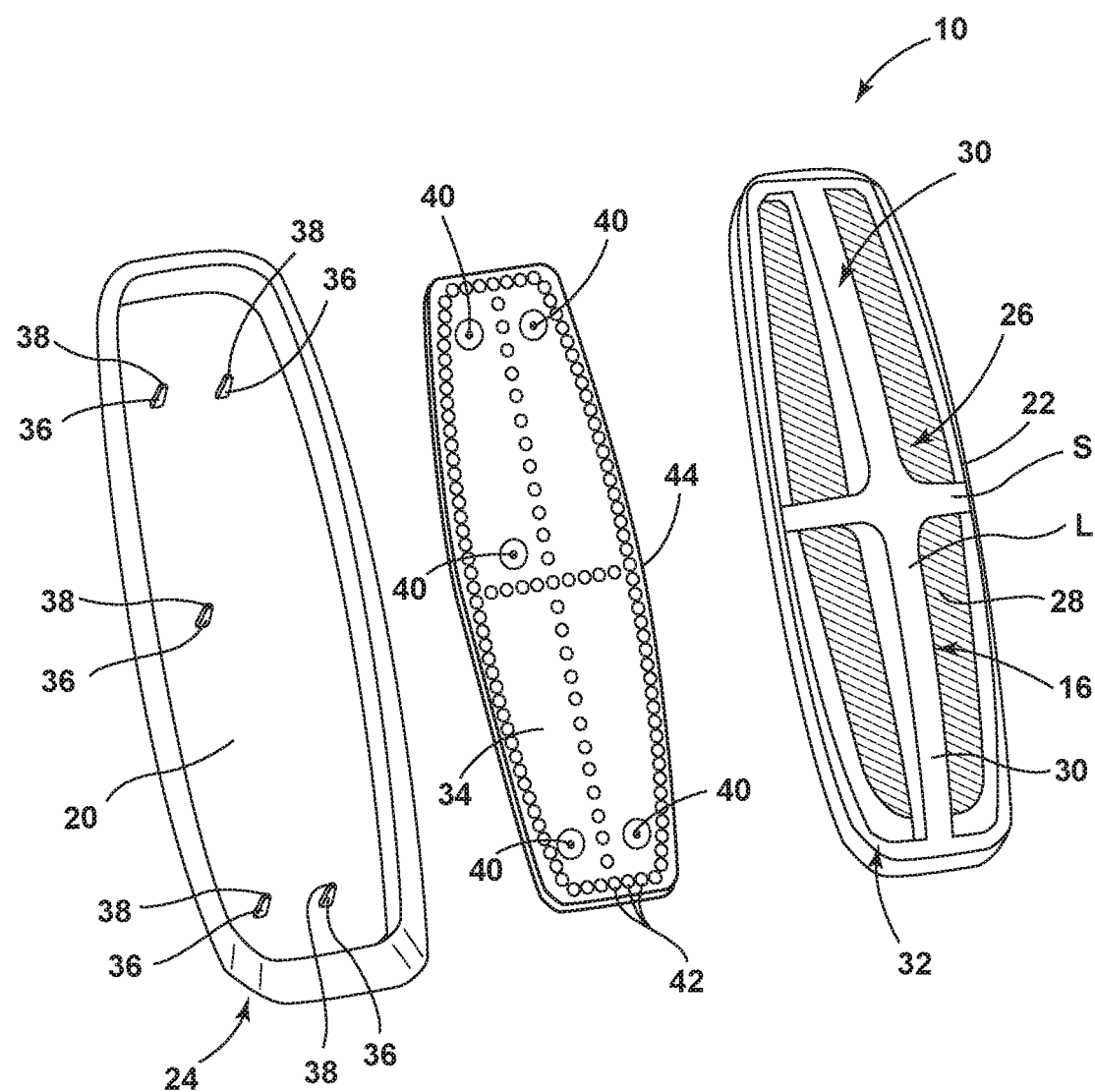
FIG. 2 is an exploded view of the badge, according to one embodiment.

Referring to FIG. 2, the badge 10 is shown, according to one embodiment, having a substrate 20 that may be attached to a housing 22. The substrate 20 may form a rear portion 24 of the badge 10 and may be capable of being secured to the vehicle 14 via any suitable means known in the art. The housing 22 may include the viewable portion 16 located on a forward portion 26 thereof. The viewable portion 16 may include a background region 28 and indicia 30. The indicia 30 may signify the make, model, or any other information that may be desirable to confer about the vehicle 14 upon which the badge 10 is attached. The viewable portion 16 may include a transparent and/or translucent portion and one or more substantially opaque portion(s), which may be configured as opaque coatings applied to the viewable portion 16. In some embodiments, some, or all, of the viewable portion 16 may be left open to the front portion 12 of the vehicle 14. According to one embodiment, the background region 28 may be opaque or light blocking whereas the portion associated with the indicia 30 is light transmissive. As shown, the indicia 30 includes a rim portion 32 and a cross-portion defined by a long arm L and a short arm S.

According to one embodiment, the housing 22 and/or the substrate 20 may be constructed from a rigid material such as, but not limited to, a polymeric material and may be assembled to one another via sonic welding, laser welding, vibration welding, injection molding, or any other process known in the art. Alternatively, the housing 22 and the substrate 20 may be assembled together via the utilization of adhesives and/or fasteners. Alternatively still, the housing 22 and substrate 20 may be integrally formed as a single component.

With further reference to FIG. 2, a printed circuit board (PCB) 34 may be secured between the substrate 20 and housing 22. According to one embodiment, the substrate 20 includes a plurality of raised platforms 36. A fastener hole 38 is defined in each platform 36 and a plurality of corresponding through holes 40 is defined by the PCB 34. Accordingly, a plurality of complementary mechanical fasteners (not shown) may be inserted through the through holes 40 of the PCB 34 and mechanically engaged to the fastener holes 38 for removably fixing the PCB 34 to the substrate 20.

Figure 3:
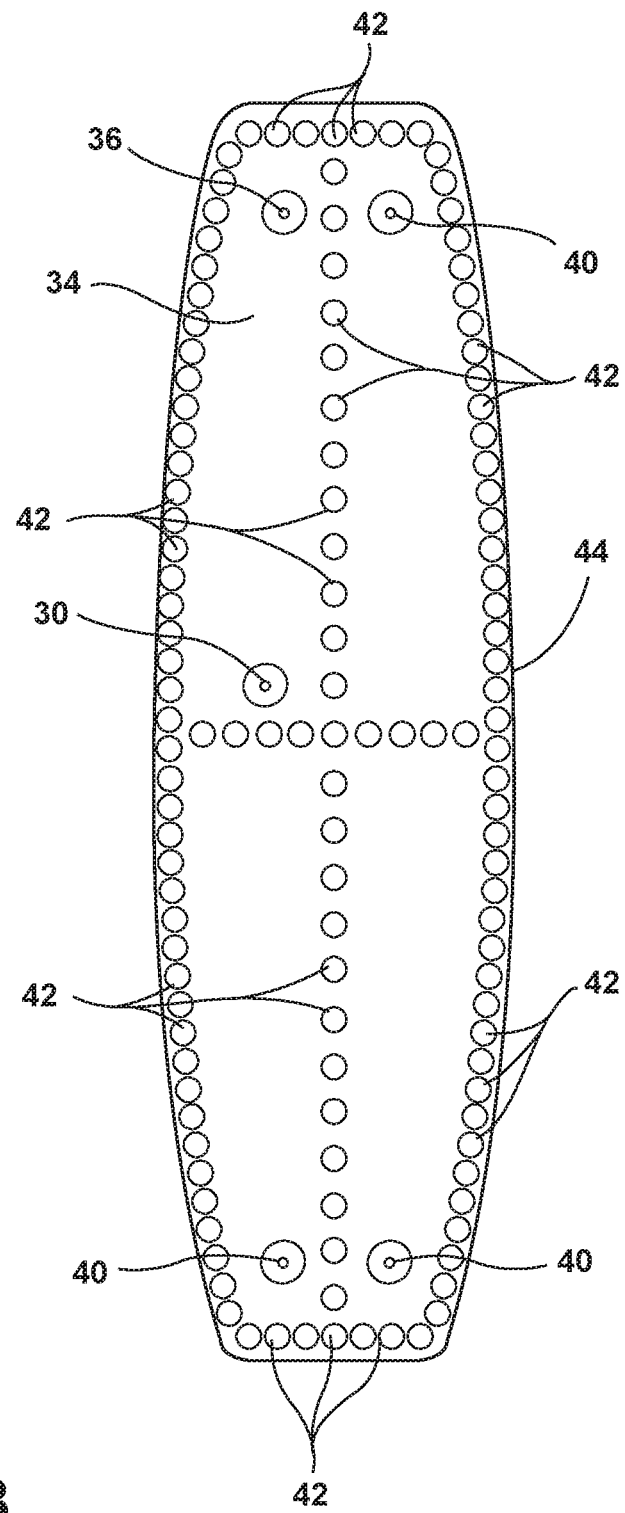
FIG. 3 is a front perspective view of a printed circuit board disposed within the badge having a plurality of light sources thereon, according to one embodiment.

Referring to FIGS. 2 and 3, the PCB 34 may have a plurality of light sources 42 disposed thereon in a variety of patterns. The light sources 42 may include any form of light source. For example, fluorescent lighting, light emitting diodes (LEDs), organic LEDs (OLEDs), polymer LEDs (PLEDs), solid-state lighting, or any other form of lighting configured to emit light may be utilized. In some embodiments, a reflective (e.g., white) solder mask may be applied to the PCB 34 to reflect light incident thereon. In the present embodiment, the light sources 42 are arranged to complement the shape of the indicia 30 and are oriented to illuminate the indicia 30. Accordingly, a portion of the light sources 42 is spaced about a peripheral edge 44 of the PCB 34 to coincide with the rim portion 32 of the indicia 30 while another portion of the light sources 42 is spaced vertically and horizontally across the PCB 34 to coincide with the long arm L and the short arm S of the indicia 30, respectively. In operation, the light sources 42 may each be independently activated to emit light in a variety of colors at variable intensity. The light sources 42 may be activated concurrently or at different time intervals to exhibit different lighting effects.

Figure 4:
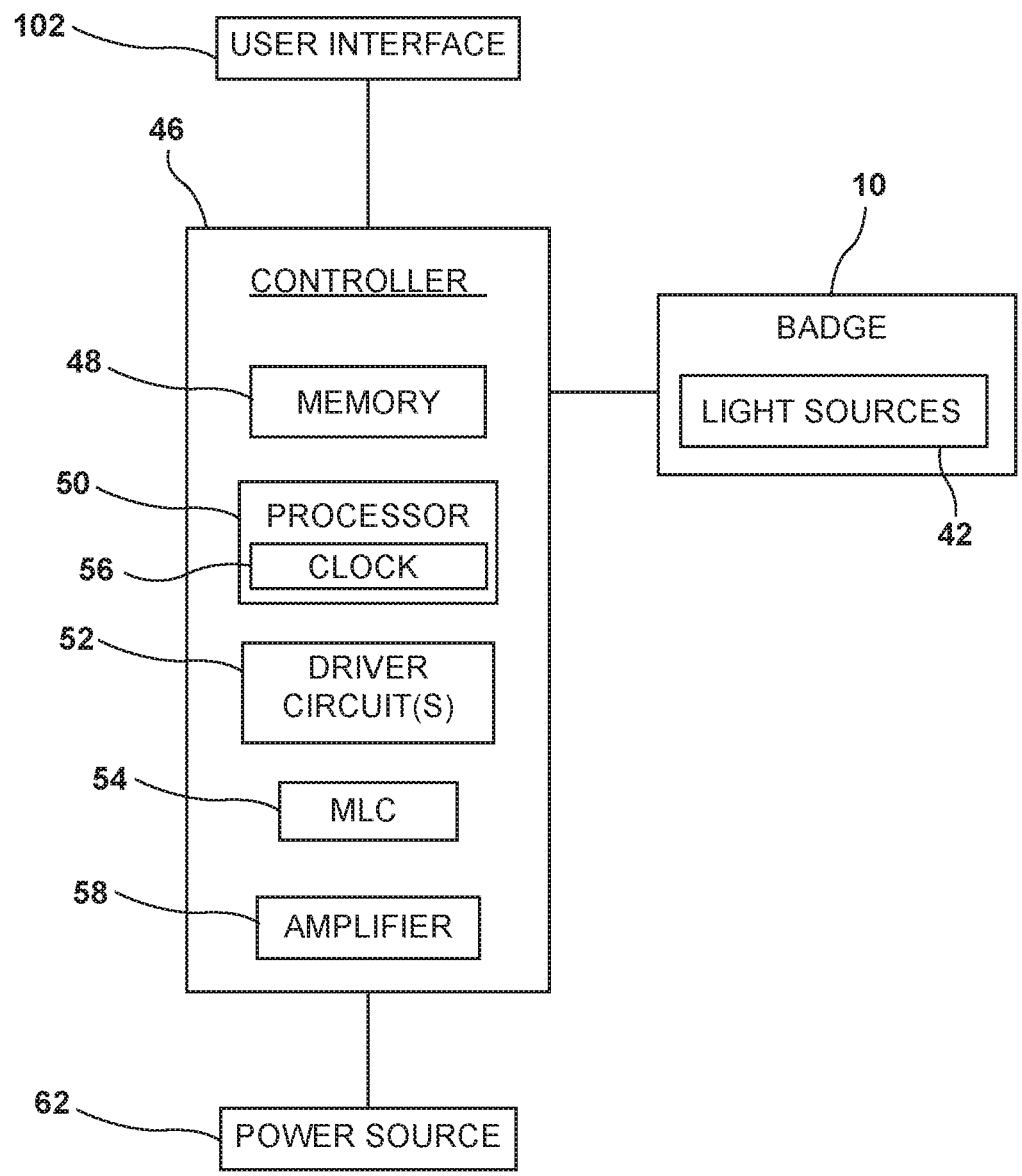
FIG. 4 is a schematic block diagram of the badge and the control arrangement configured to illuminate light sources disposed on the badge in a desired illumination sequence(s), according to one embodiment.

Referring to FIG. 4, a controller 46 is operably coupled to the badge 10 and is configured to independently control an activation state of each of the light sources 42. The controller 46 may be located on the PCB 34 or disposed elsewhere in the vehicle 14. The controller 46 includes a memory 48 having instructions stored therein that are executable by a processor 50 for controlling the light sources 42. The controller 46 may also include one or more driver circuits 52 operably coupled to the light sources 42. According to one embodiment, the controller 46 includes a master level controller (MLC) 54, which may be embodied as either a MOSFET or a transistor and is connected in series with each driver circuit 52. In operation, the MLC 54 may control the overall electric current signal values of the light sources 42 and provide for better resolution. For example, if using software implemented pulse width modulations to control the light intensity of the light sources 42, the pulse width modulations are generally limited by the rate of the clock 56 in the processor 50, or any other timer or counter disposed on the controller 46, which itself is limited by power consumption. In such a scenario, it is typical to achieve 50 equally spaced current levels and possibly 255 current levels in a best-case scenario. However, since the perception of light intensity is logarithmic, of the 50 current levels, for example, only the first few current levels will introduce a perceivable difference, thus resulting in poor resolution. By employing the MLC 54, square resolution is achievable. Accordingly, if 50 current levels were previously available via pulse width modulations, the inclusion of the MLC 54 would provide 2,500 current levels. As a result, one may achieve smaller increments at lower intensity levels and larger increments at higher intensity levels, thereby improving the resolution of the badge 10.

In an alternative embodiment, the MLC 54 is omitted in favor of an amplifier 58 disposed at the output of each driver circuit 52. The amplifier 58 may be exponential or logarithmic and enables the light sources 42 to exhibit increased ramp up at higher intensities and decreased ramp up at lower intensities to improve resolution.

The badge 10 may also include a user interface 102. The user interface 102 may be configured such that a user may control the light sources 42. The user interface 102 may be disposed within the vehicle cabin or on any surface that is accessible to the user during utilization of the badge 10. The user interface 102 may use any type of control known in the art for control of the light source 42, such as, but not limited to, proximity sensors. The user interface 102 may be utilized to alter any lighting characteristic of the badge 10, any parameter of the badge 10, or the activation state of the badge 10. Additionally, the user interface 102 may be used to define lighting sequences or the colors of emitted light that are emitted from the light sources 42. It should be appreciated, however, that the user interface 102 may control any other feature of the badge 10 without departing from the teachings provided herein.

Figure 5:
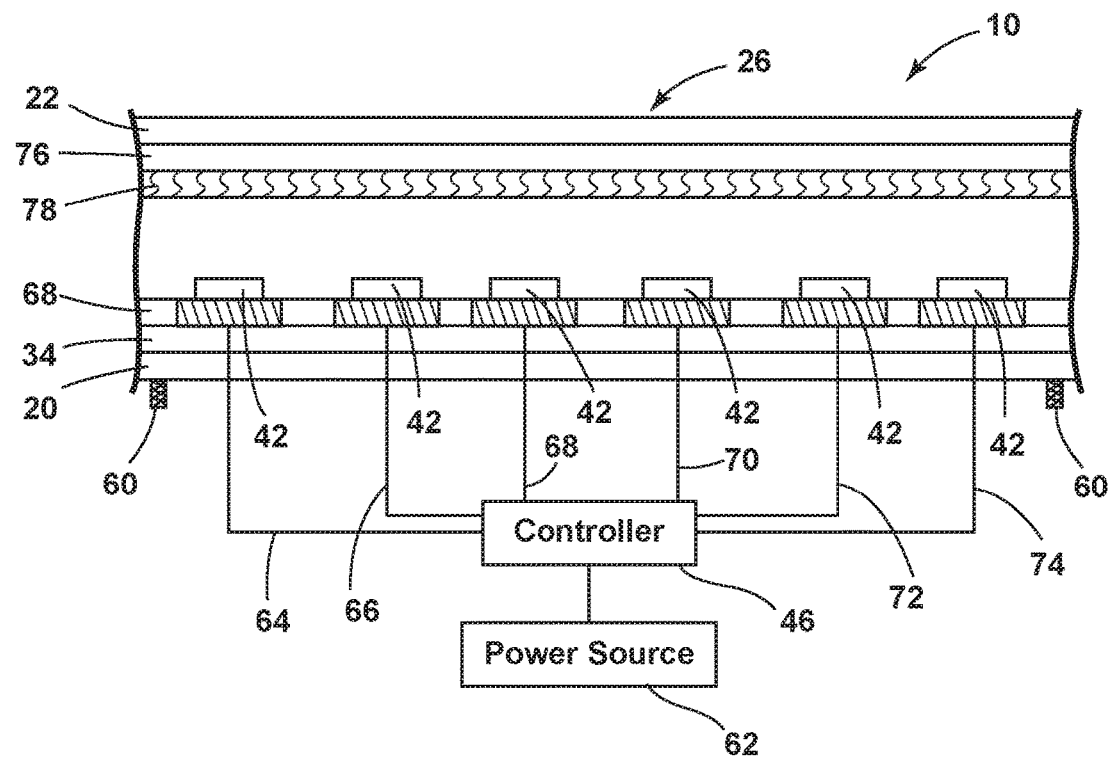
FIG. 5 is a cross-sectional view taken along the line V-V of FIG. 1 illustrating the badge, according to an alternate embodiment, having a plurality of independently illuminable light sources disposed rearwardly of a viewable portion, according to one embodiment.

Referring to FIG. 5, the badge 10 includes the housing 22 having the viewable portion 16, as described above, and the substrate 20 that is capable of being secured to a vehicle 14 through attachment points 60. Any practicable means may be used for attaching the badge 10 to the vehicle 14 including any known process for mounting the badge 10 onto a vehicle 14, or integrally forming portions of the badge 10 (e.g., the substrate 20) with additional vehicle components, such as portions of the grille assembly 18. The viewable portion 16 may illuminate in one or more predefined patterns.

As illustrated in FIG. 5, each light source 42 is independently and electrically connected to the controller 46 and a power source 62 via electrical leads 64, 66, 68, 70, 72, 74. However, in alternate embodiments, each light source 42 may be connected in series, in parallel, and/or any combination thereof without departing from the teachings provided herein. As described above, the illumination of each light source 42 may be offset from any other light source 42 within the badge 10 to create various predefined lighting patterns. The lighting patterns may be predefined when the badge 10 is assembled, or may be later flashed to the controller 46 within the vehicle 14 and/or the badge 10 to add additional lighting patterns to the badge 10 at any time after installing the badge 10 on the desired surface.

The badge 10 may include a decorative layer 76 that is disposed between the light sources 42 and the viewable portion 16. However, the decorative layer 76 may be disposed in any other location within the badge 10 in alternate embodiments. The decorative layer 76 may include any suitable material that is configured to control or modify an appearance of the viewable portion 16. For example, the decorative layer 76 may be configured to confer a metallic appearance to the viewable portion 16. The metallic appearance can be disposed rearwardly of, or on any surface of, the housing 22 through any method known in the art, including, but not limited to, sputter deposition, vacuum deposition (vacuum evaporation coating), electroplating, or directly printing onto the housing 22. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. The decorative layer 76 or some portion thereof may be transparent and/or translucent to allow light to pass therethrough from an inner surface to an outer surface.

In other embodiments, the decorative layer 76 may be tinted any color to complement the vehicle structure on which the badge 10 is to be received. In any event, the decorative layer 76 may be at least partially light transmissible such that light emitted from one or more light sources 42 is not prevented from illuminating the viewable portion 16. The decorative layer 76 may also include opaque portions that may correspond with the opaque background region 28 of the badge 10.

With further reference to FIG. 5, a light diffuser 78 may be disposed between the viewable portion 16 and the light sources 42. For example, the light diffuser 78 may be a layer applied to the underside of the viewable portion 16. The diffuser 78 can be transparent or translucent and generally functions to diffuse the light from the light sources 42 so that unwanted hot spots and shadows are minimized. According to one embodiment, the inner surface and/or outer surface of the viewable portion 16 may be coated, roughened or receive micro-faceting to aid in the light diffusion performance. Additionally, or alternatively, the diffuser 78 may be applied to a portion of the decorative layer 76 in order to optimize the light diffusing effect. In alternate embodiments, the diffuser 78 may be applied to or disposed on some or all of the light sources 42 disposed within the badge 10.

Figure 6:
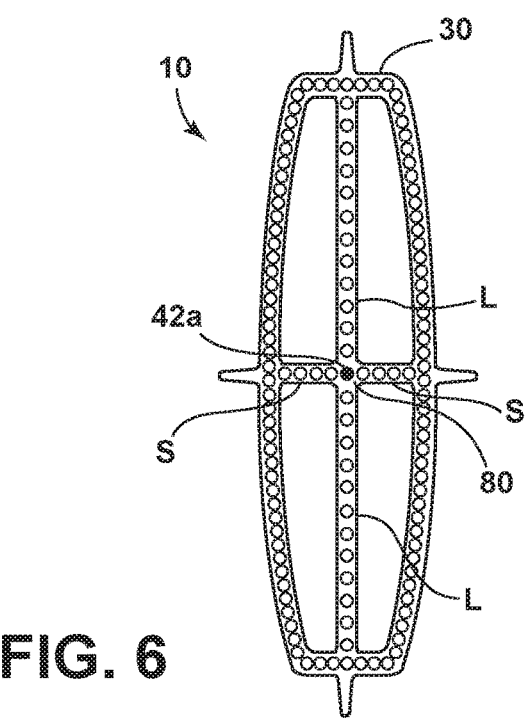
FIG. 6 is a first state of an exemplary illumination sequence that may be implemented by the badge.
Figure 7:
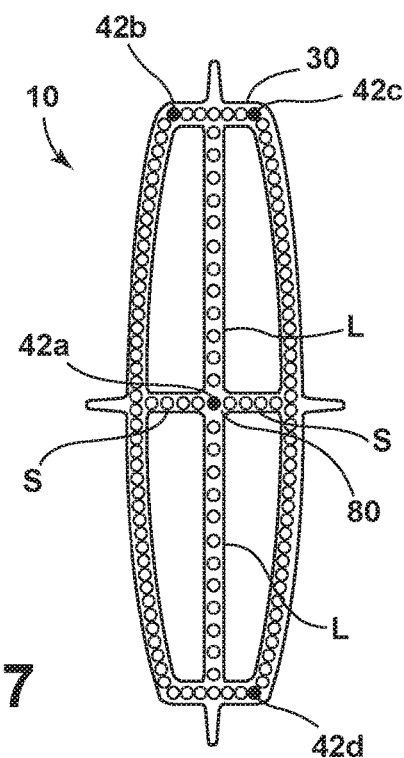
FIG. 7 is a second state of an exemplary illumination sequence that may be implemented by the badge.
Figure 8:
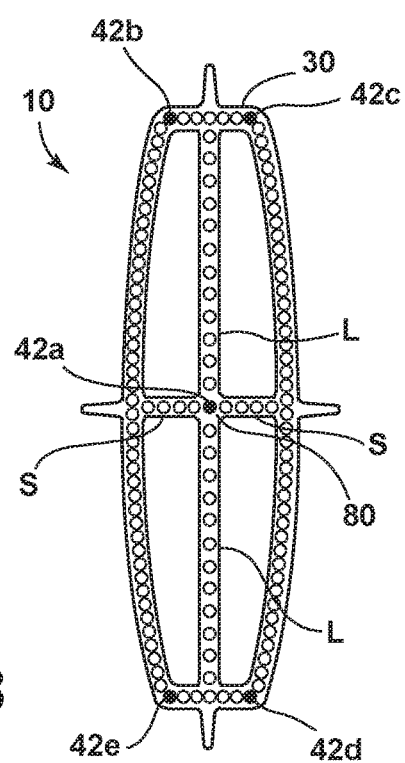
FIG. 8 is a third state of an exemplary illumination sequence that may be implemented by the badge.

Referring to FIGS. 6-8, a lighting sequence of the badge 10 is shown according to one embodiment. For purposes of illustration, the light sources 42 are visibly shown through the indicia 30 of the badge 10. The lighting sequence may begin by first activing light source 42*a* to illuminate a first portion, such as a central area 80 of the indicia 30, as shown in FIG. 6. Next, as shown in FIG. 7, alternate light sources 42 that correlate to the indicia 30, according to the illustrated embodiment, are illuminated at varying intensities. Next, as shown in FIG. 8, different light sources 42*a*, 42*b*, 42*c*, 42*d*, 42*e* may be illuminated at varying intensities for varying lengths of time concurrently and/or sequentially.

In operation, any number of light sources 42 disposed within the badge 10 are independently activated in a randomized manner such that each independently illuminable light source 42 may illuminate and return to an unilluminated state at randomized times, for varying lengths of time, at varying intensities, and in a variety of colors. Thus, the randomized illumination of the light sources 42 may create a "sparkle" effect.

Figure 9:
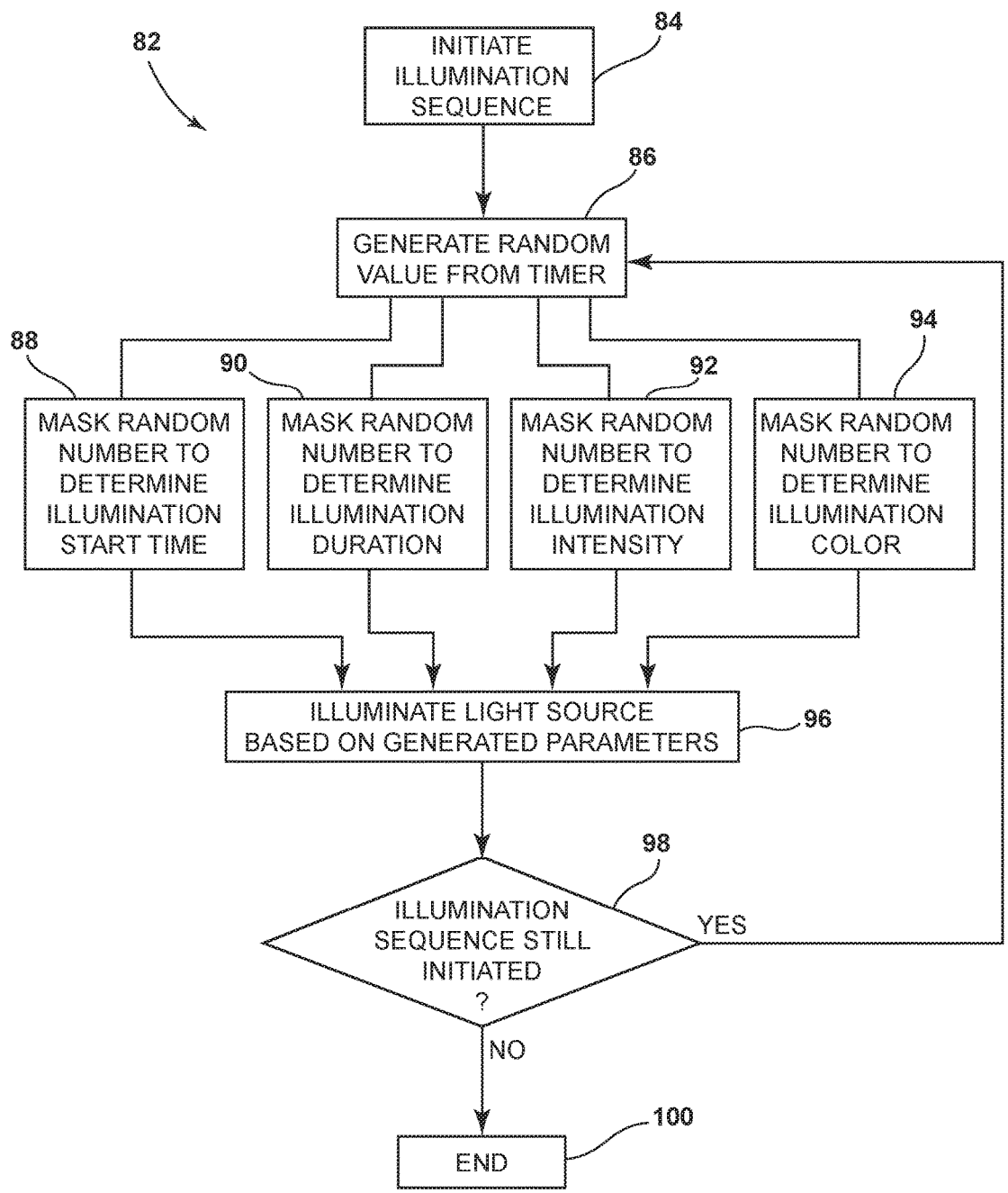
FIG. 9 is a flow diagram illustrating a method of illuminating the badge that includes randomizing one or more illumination parameters to generate a pseudo-random illumination sequence, according to one embodiment.
Figure 10:
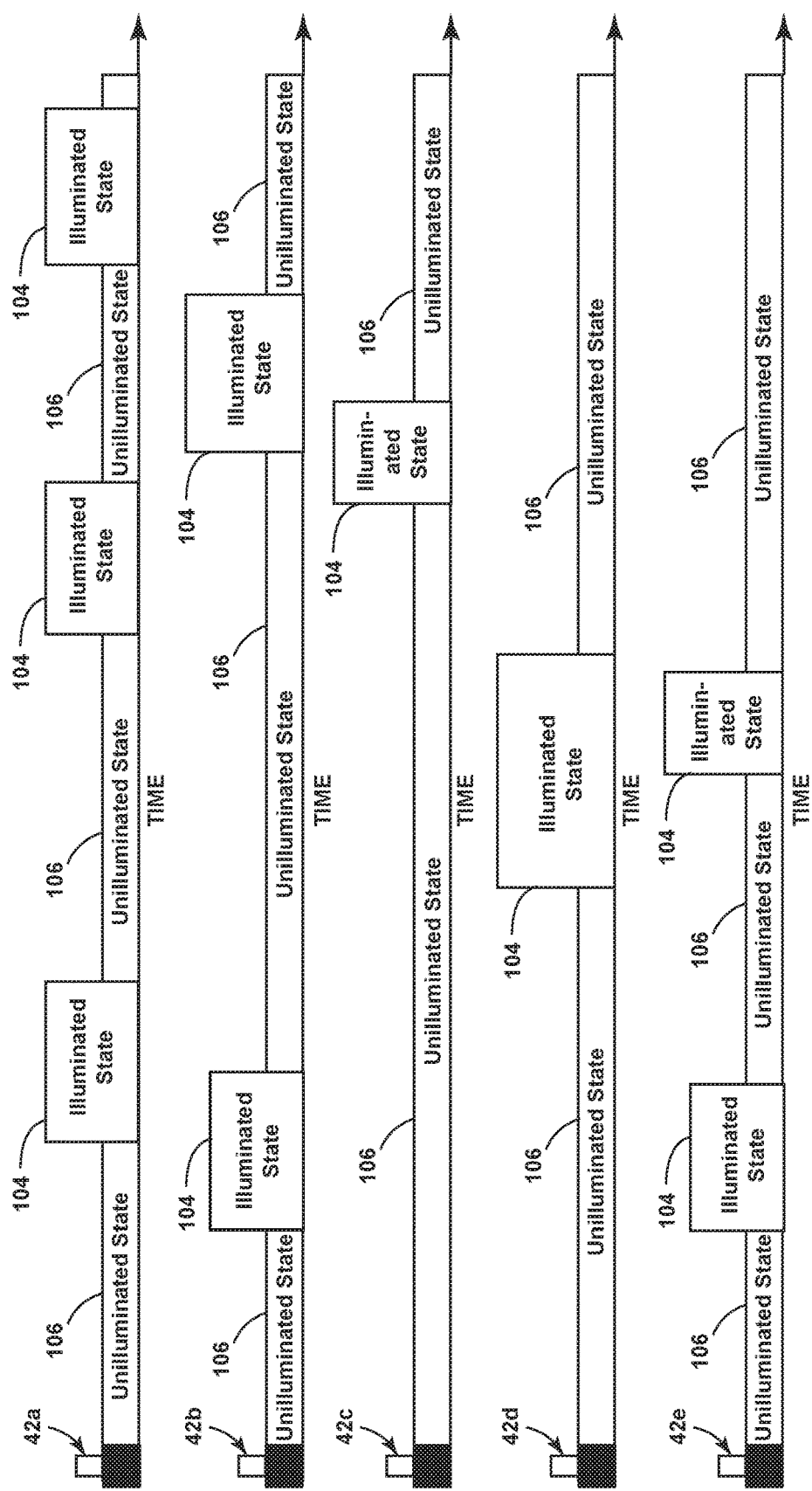
FIG. 10 illustrates an illumination sequence of five exemplary light sources, according to one embodiment, that illuminate at varying times, for varying periods of time, at varying intensities, and in varying colors.

Referring to FIGS. 9 and 10, a routine 82 for producing one or more independently illuminable light sources 42 having varying parameters is illustrated. The activation state of each respective light source 42, according to the embodiment of FIGS. 8 and 9, is controlled by its own routine 82 that is independently timed during the illuminated and the unilluminated states of each respective light source 42.

With reference to FIG. 9, an embodiment of the badge 10 is illustrated schematically in which the badge 10 is configured to generate randomized parameters for illumination of each light source 42. In step 84, the illumination sequence for generating a randomized illumination pattern is initiated. The illumination sequence may be initiated based on initiation of any predefined vehicular condition. For example, the illumination sequence may be initiated through a user interface 102 or through a light sensor. Alternatively, the illumination sequence may be initiated whenever a light disposed on the vehicle 14 is placed in an illuminated state. Alternatively still, the illumination sequence may be initiated whenever a vehicle lighting system is initiated or whenever an engine of the vehicle 14 is initiated.

In step 86, according to one embodiment, a random value may be generated from a sample taken from one or more of the clocks, counters, and/or timers disposed within the controller 46 that may be consistently running while the randomized illumination routine 82 is initiated on the badge 10. With a 16-bit counter, a pseudo-random base value may be generated that is between 0 and 65,535. This base value may then be scaled to a smaller range of values, if desired, as will be described in greater detail below.

The numbers by themselves are not random. The definition of randomness includes not only the characteristics of the numbers generated, but also the characteristics of the generator that produces the numbers. According to one embodiment, a hardware generator that generates numbers with the same characteristics of numbers generated by a random physical process may be utilized. According to an alternate embodiment, a software based random number generated may be utilized. The important characteristics are the degree to which the numbers produced have a non-biased statistical distribution, are unpredictable, and statistically are generally irreproducible. However, in alternate embodiments, the random numbers may be reproducible based on reconstruction, or through the use of a predefined algorithm for determining an illumination sequence.

Having a non-biased statistical distribution means that all values have equal probability of occurring, regardless of the sample size. Almost all applications may utilize a good statistical distribution of their random numbers, and high-quality random number generators can usually meet this requirement. A generator that meets only the non-biased statistical distribution requirement is called a pseudo-random number generator. Unpredictability refers to the fact that the probability of correctly guessing the next bit of a sequence of bits should be exactly one-half, regardless of the values of the previous bits generated.

In order for a generator to be generally irreproducible, two of the same generators, given the same starting conditions, will produce different outputs. A hardware generator based on random physical processes can generate values that meet the irreproducibility condition.

According to one embodiment, an inexpensive, high-performance hardware random number generator would be to incorporate it within a microprocessor 50. The random number generator can utilize random physical process sources such as those discussed above, and would be relatively inexpensive, since it would be incorporated into an already existing semiconductor die.

The random number generators are shown as delivering 16-bit random numbers to a system bus in an integrated circuit such as a single-chip controller 46. The integrated circuit is driven by a system clock 56, not explicitly shown in the drawings, and requests random numbers by driving a read signal to the high (active) state at times controlled, for example, by a microcomputer application program.

The clock pulses may be gated by logic AND gates and counted by one or more counters. The counters may be eight-bit up-counters. The counter may include a read-out control circuit which outputs the counter contents only when a high signal is received at an output enable (OE) terminal, to which the read signal is connected. Accordingly, the OE terminal may mask some bits such that a pseudorandom number may be defined between any sample size. The output terminals may be connected to a 16-bit system bus which carries the outputs to other parts of the integrated circuit, such as memory 48 and controller circuits.

At steps 88, 90, 92, and 94, to reduce the cost of the controller 46, an alternative to floating math may be utilized to generate the desired parameters of illumination for each light source 42. According to one embodiment, a cheaper controller 46 may be utilized that instead of scaling the random base value, using a bitwise operation that masks a predefined number of bits. In other words, the masked bits may be ignored such that only the unmasked bits are used to determine a random base value based on the unmasked bits. For the embodiment illustrated in FIG. 9, an eight-bit random base value is generated. It will be appreciated, however, that in alternate embodiments any number of bits may be used to generate any illumination parameters without departing from the teachings provided herein.

At step 88, a portion of the bits are masked to reduce the number of possible illumination initiating times. For example, some of the bits may be masked to generate a number between 0 and 15. Thus, each independently illuminable light source 42 may have 16 different lengths of unilluminated time between its illumination periods.

Likewise, at step 90, the random base value may be used for determining the illumination period length based on the bits that are not masked. At step 92, all eight bits may be utilized, with no masking, such that 256 intensity levels may be generated by each respective light source 42. Lastly, at step 94, an illumination color may also be determined based on the generated random number. The badge 10 may include any number of predefined colors that correlate to the same amount of numbers that may be generated by the processor 50.

Each of the parameter determinations made in steps 88, 90, 92, and/or 94 may be generated through comparing the random number to stored parameters within a lookup table (LUT). A counter is used as a pointer into the lookup table. According to one embodiment, at least one selection circuit is configured to select a predefined output from the corresponding lookup table according to bits in the random base value.

At step 96, the processor 50 compiles each of the randomly determined parameters and illuminates the respective light source 42 based on the compiled parameters. Once the illumination period for the respective light source 42 ceases, at step 98, a new random value is generated for the light source 42 and a new illumination pattern is determined. This process may be repeated until the illumination sequence ends at step 100.

Referring to FIG. 10, the illumination sequences of five independently illuminable light sources 42*a*, 42*b*, 42*c*, 42*d*, 42*e* are schematically illustrated. For illustrative purposes, the illumination states of each light source 42*a*, 42*b*, 42*c*, 42*d*, 42*e* are shown as rectangles 104 of varying sizes. The length of each illuminated state rectangle exemplifies the illumination period of each light source 42*a*, 42*b*, 42*c*, 42*d*, 42*e*. The height of each illuminated state rectangle exemplifies the intensity of light emitted from the light source 42*a*, 42*b*, 42*c*, 42*d*, 42*e*. Unilluminated state rectangles 106 are disposed between each of the illuminated state rectangles 104 and illustrate time periods in which each respective light source 42*a*, 42*b*, 42*c*, 42*d*, 42*e* is in an unilluminated state. Moreover, as described above, the light sources 42 may each illuminate in a wide range of randomly generated colors in some embodiments.

Figure 11:
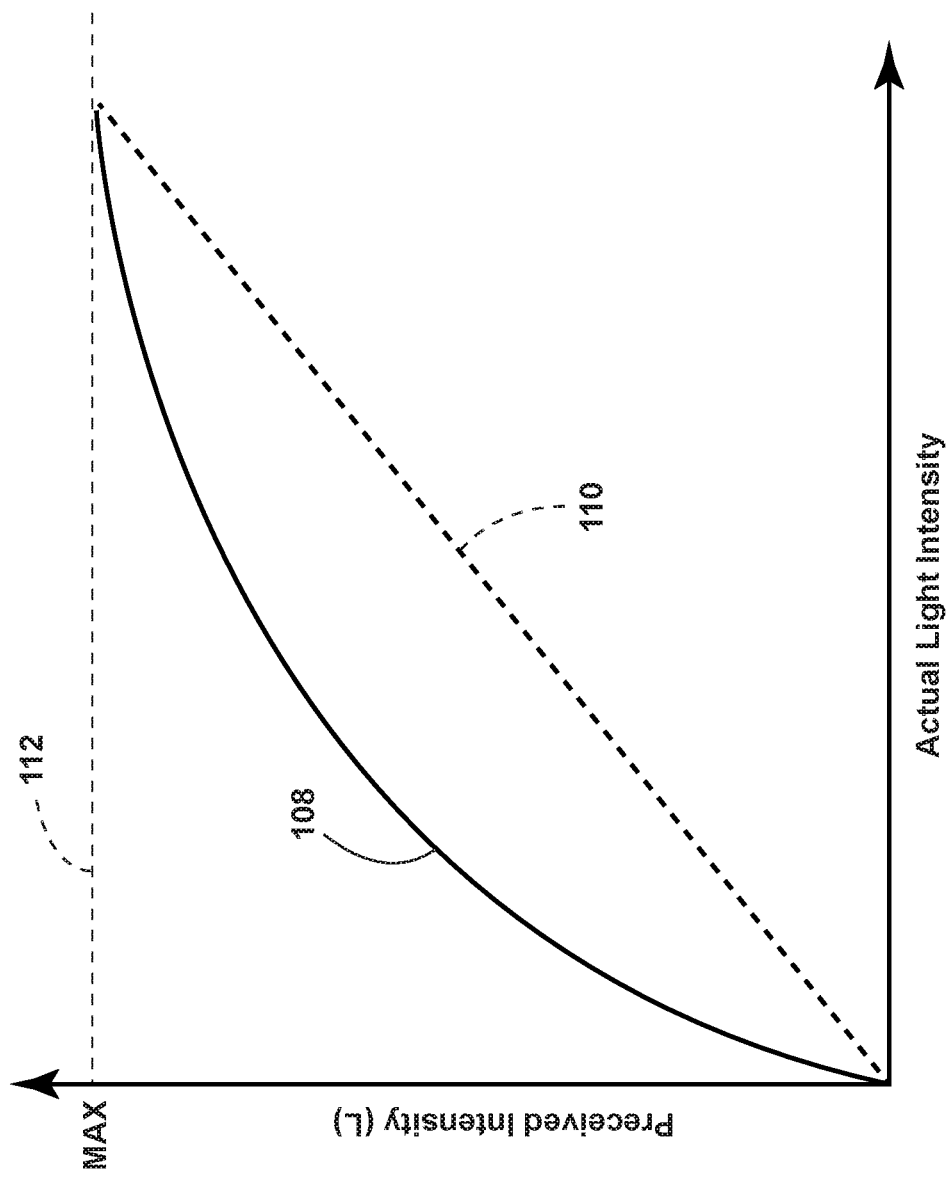
FIG. 11 is a graph illustrating a perceived light intensity and actual light intensity, according to one embodiment.
Figure 12:
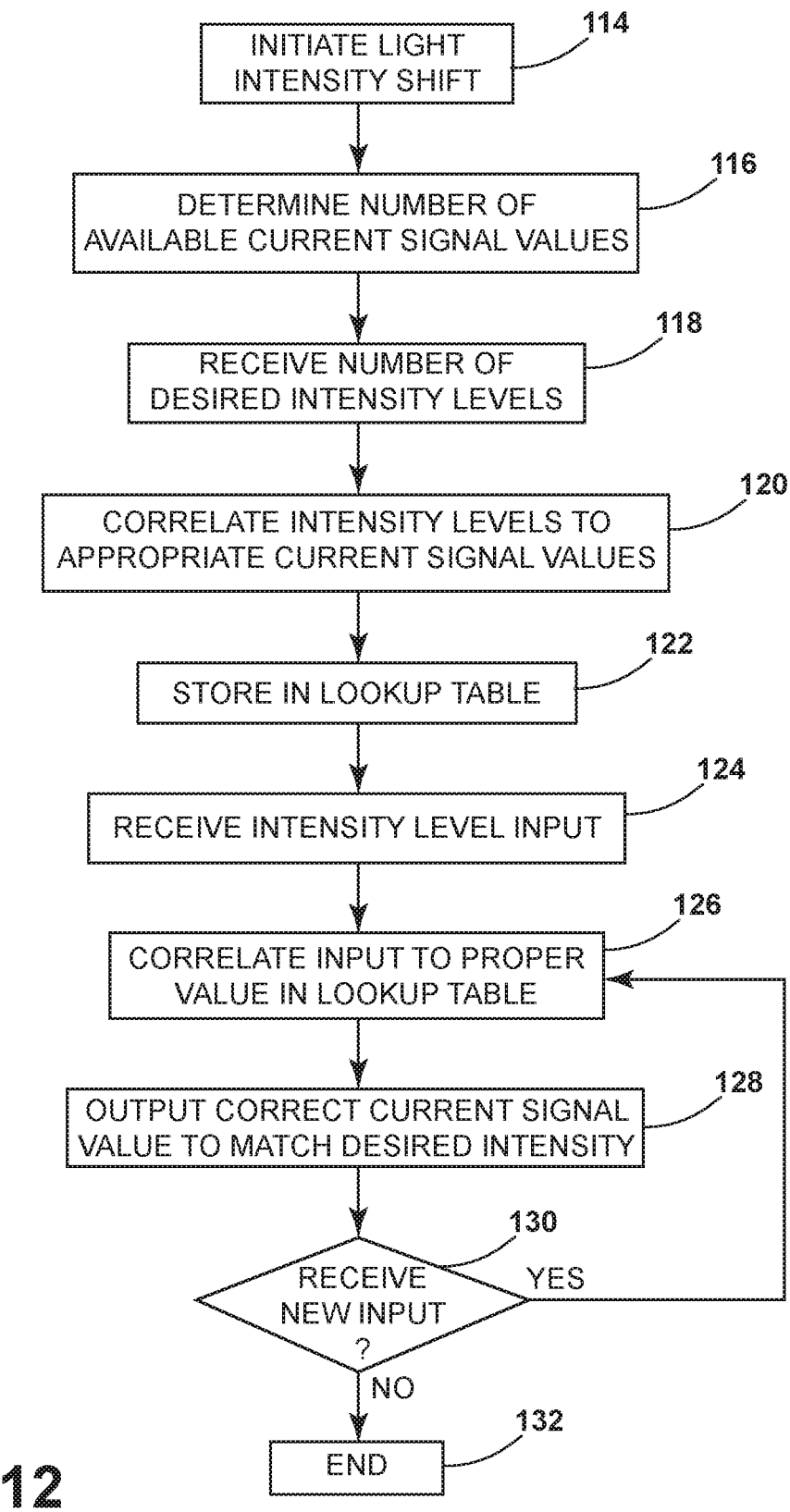
FIG. 12 is a flow diagram illustrating a method of illuminating that badge that includes randomizing one or more illumination parameters to generate a pseudo-random illumination sequence, according to one embodiment.

Referring to FIGS. 11 and 12, a human eye responds to decreases in the measured light percentage by automatically enlarging the pupil to allow more light to enter the eye. Allowing more light to enter the eye may result in the perception that the light is actually brighter. Thus, the light perceived by the human eye may be greater than the measured light. For example, the curve 108 in FIG. 11 illustrates the perceived intensity (L) of the emitted light while the line 110 illustrates the outputted light intensity. In one embodiment, measured light and perceived light percentages do not completely converge until measured light is approximately 100% ($L_{max}$ 112). Because of the non-linear relationship between measured light intensity and perceived light intensity (L), the illumination of the badge 10 may appear to have a small electric current signal value range, which may be defined as the full range of current output levels of the controller 54. Thus, according to one embodiment, the intensity of the emitted light may be mapped to a lookup table that substantially matches the perceived light intensity (L). Accordingly, an increase in light intensity from 0% to 100% inputted current would appear linear, rather than logarithmic.

With reference to FIG. 12, one embodiment of the badge 10 is illustrated schematically in which the badge 10 is configured to convert a desired light intensity L to an input current $I_p$ through pulse width modulation, direct current control, or through any other means known in the art that generates a desired perceived linear response. It will be understood that the due to Ohm's law, the voltage levels may alternatively be controlled without departing from the teachings provided herein.

At step 114, the system is initiated. At step 116, a determination of a maximum amount of electric current signal values that may be output by the implemented controller 46 is calculated. For example, an eight-bit controller 46 may include 256 electric current signal values. At step 118, to reduce the cost of the controller 46 necessary to control the badge 10, a desired number of intensity levels that is less than the maximum electric current signal values is inputted. As will be described in greater detail below, the intensity levels correlate to the maximum electric current signal values such that a perceived increase in light intensity emitted from the light source 42 appears linear along the full range of available electric current signal values.

At step 120, according to one embodiment, a function is utilized to correlate the desired number of intensity levels to corresponding electric current signal values that may be utilized to form a perceived linear increase and/or decrease in emitted light intensity as the intensity is increased and/or decreased from a first electric current signal value to a subsequent electric current signal value. The conversion of a desired light intensity L to an input current $I_p$ that generates a desired perceived linear response is defined by the following relationship:

$$I_p = \left(\sqrt[2]{kL}\right)^3$$

where k is equal to a scaling coefficient that is determined by the number of desired parameters stored within the lookup table. Thus, for an eight bit pulse-width modulation controller 46 (creating 255 intensity outputs, plus an unilluminated state) having 40 desired intensity levels, the scaling coefficient k would equal:

$$k = \frac{\left(\sqrt[3]{I_p}\right)^2}{L} = \frac{\left(\sqrt[3]{255}\right)^2}{40} = 1.0053$$

The relationship shown above may then be used to create a lookup table defining the predefined electric current signal values, according to one embodiment. To determine each electric current signal value to be stored in the lookup table, a desired number of intensity levels is defined. For example, 40 levels may be desired to correlate to the 256 available electric current signal values.

At step 122, each integer from 0 to 40 is entered individually into the relationship above and the resulting electric current signal value is stored in the memory 48 as the electric current signal value for the respective desired intensity level. The desired intensity levels and corresponding electric current signal values may be stored as a lookup table such that the forty desired intensity levels are equal to the eight bit values provided in the lookup table. Thus, the 40 outputted values that would linearly map to the 255 intensity outputs would equal {0, 1, 3, 5, 8, 11, 15, 19, 23, 27, 32, 37, 42, 47, 53, 59, 64, 71, 77, 83, 90, 97, 104, 111, 118, 126, 134, 141, 149, 157, 166, 174, 182, 191, 200, 209, 218, 227, 236, 245, 255}.

According to an alternate embodiment, the conversion of a desired light intensity L to an input current $I_p$ that generates a desired perceived linear response may be defined by the following relationship:

$$I_p = e^{kL} - 1$$

where k is equal to a scaling coefficient that is determined by the number of desired parameters stored within the lookup table and e is Euler's number, which is a numerical constant that is equal to 2.71828. Thus, for an eight bit pulse-width modulation (creating 255 intensity outputs, plus an unilluminated state) having 40 desired intensity levels, the scaling coefficient k would equal:

$$k = \frac{\ln(255)}{40} = 0.1386$$

The relationship shown above may then used to create a lookup table defining the predefined electric current signal values, according to one embodiment. To determine each electric current signal value to be stored in the lookup table, a desired number of intensity levels is defined. For example, 40 intensity levels may be desired to correlate to the 256 available electric current signal values.

It will be appreciated that any other function may be used to determine a desired electric current signal value to be output from the light source 42. According to one embodiment, a processing algorithm may be utilized such that lookup tables need not be used. According to an alternate embodiment, processing algorithms that do not utilize lookup tables may be used in conjunction with other lighting parameters that may use lookup tables.

At step 122, each integer from 0 to 40 is entered individually into the relationship above and the resulting electric current signal value is stored in the memory 48 as the electric current signal value for the respective desired intensity level. The desired intensity levels and corresponding electric current signal values may be stored as a lookup table such that the forty desired intensity levels are equal to the eight bit values provided in the lookup table. Accordingly, the 40 outputted values that would map to the current intensity outputs would equal {0, 0, 0, 1, 1, 1, 1, 2, 2, 2, 3, 4, 4, 5, 6, 7, 8, 10, 11, 13, 15, 17, 20, 23, 27, 31, 36, 41, 48, 55, 63, 73, 83, 96, 110, 127, 146, 168, 193, 222, 255}.

At step 124, the controller 46 receives an inputted desired intensity level. The input may be received through a process running on any processor 50 and/or controller 46 disposed on the badge 10 and/or the vehicle 14, such as the illumination pattern described in reference to FIGS. 6-8, or may be inputted through a user interface 102 by an occupant of the vehicle 14. The inputted desired intensity level is chosen from the predefined intensity levels.

At step 126, the inputted intensity level is correlated to an electric current signal value through the usage of the values stored within the lookup table. At step 128, the controller 46 outputs the defined electric current signal value to cause the light source 42 to emit a desired light intensity. At step 130, the badge 10 monitors for the receival of a new input. If a new input is received, a perceived linear increase or decrease in light intensity may be outputted from the light source 42. Because the human eye responds to small variations in light intensity at low levels, the light intensity may increase at a slower rate at lower intensities than when illuminating the light source 42 at a higher desired intensity. It will be appreciated that the implementation of a mapping function and the desired number of defined intensity levels are both matters of design choice. The defined intensity levels can be predetermined and embodied in the memory 48 of the controller 46. The memory 48 can store the defined intensity levels in one or more lookup table(s). For each defined intensity level, the lookup table can include one or more corresponding electric current signal values. It will be understood that any function, equation, process, and/or method may be used for mapping any number of electric current signal values to any number of desired intensity levels without departing from the teachings provided herein.

At step 132, if the controller 46 does not receive a new input to change the intensity of light emitted from the light source 42, the badge 10 ends the conversion process. Accordingly, once the conversion process is ended, the light source 42 may continue emitting light at the desired intensity or return to an unilluminated state. Once a new input is received, the process can begin again at step 114 or at step 126.

Figure 13:
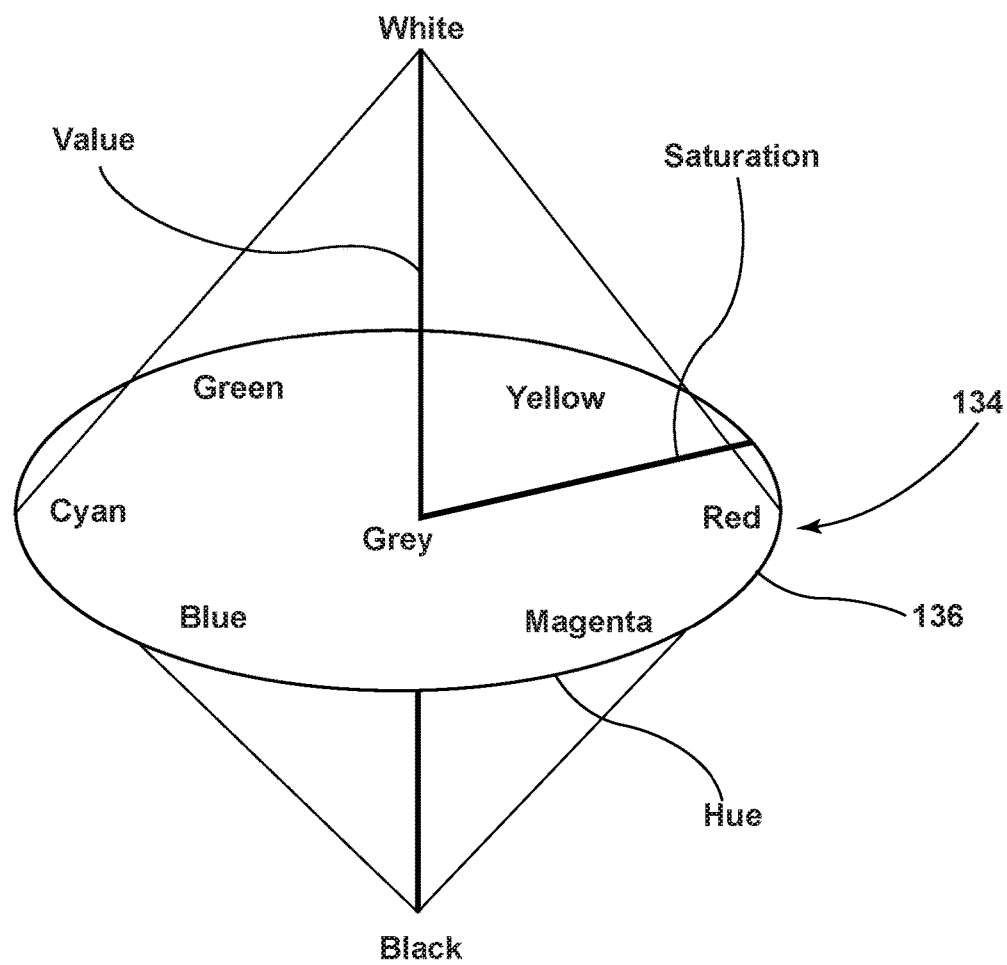
FIG. 13 is a schematic representation of a hue, saturation, and value (HSV) color model.
Figure 14:
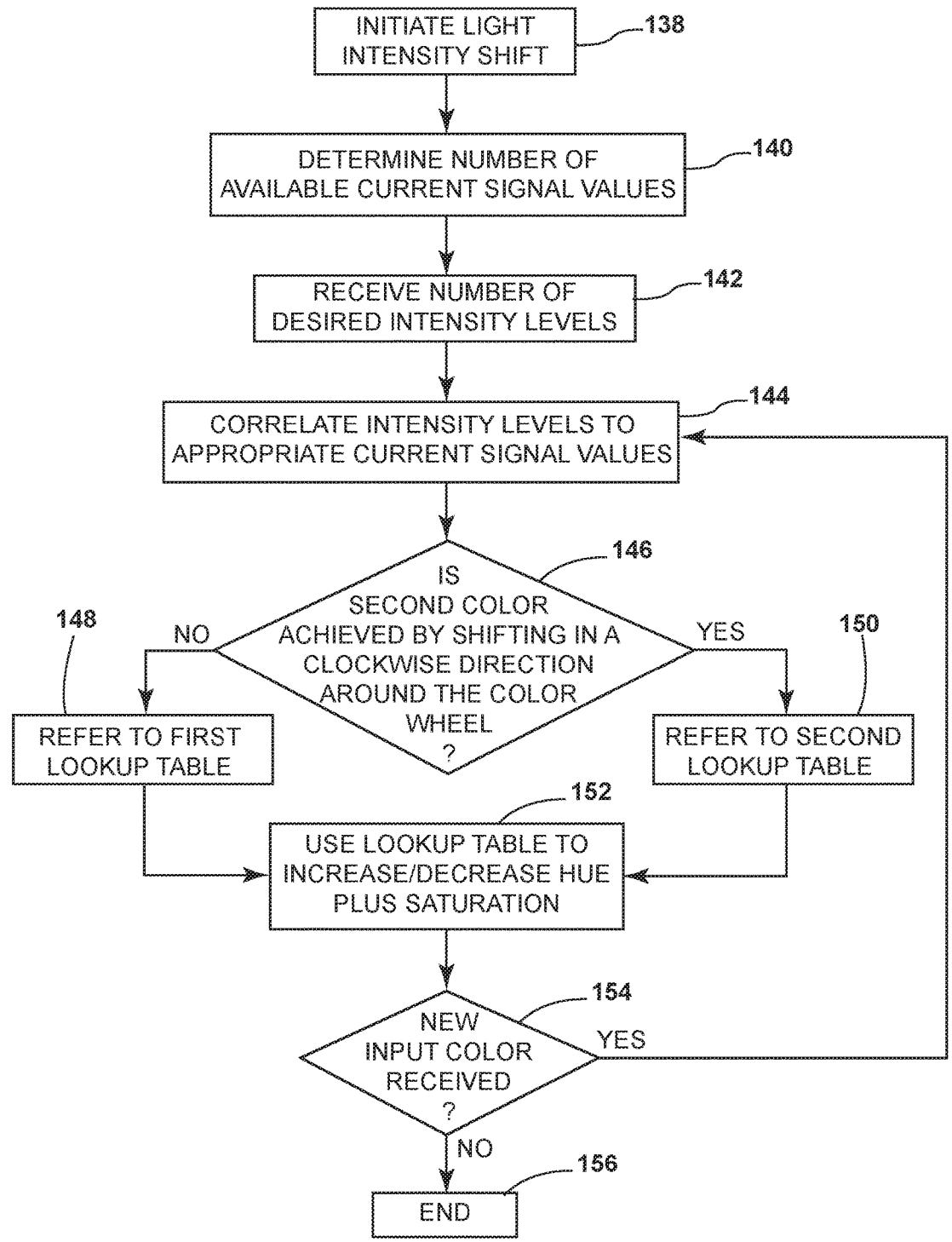
FIG. 14 is a flow diagram illustrating a method of shifting the illumination color of a light source disposed on the badge from a first color to a second color, according to one embodiment.

Referring to FIGS. 13 and 14, in addition to, or alternatively to, the perceptive linear intensity modification described above, the controller 46 may be configured to linearly adjust between varying color hues emitted from the light source 42 through a color mapping method that may imitate the physical nature of light.

As illustrated in FIG. 13, the RGB color space 134 is a hardware-oriented scheme that may be utilized by multicolored light sources 42. In the RGB color space 134, the three primary colors of red, green, and blue are distributed along a ring 136 and are separated from each other by 120 degrees, the secondary colors lie in-between the primary colors, and the solid ring 136 of colors spanning all of the spaces between the primaries is created. The solid ring 136, which holds the hue coordinate, indicates the color as described by wavelength. The radius of the ring, which holds the saturation coordinate, indicates the amount of color that is present. A conversion to a hue, saturation, and value (HSV) color model may be shown by a line normal to the hue-saturation plane that holds the value (e.g., intensity) coordinate and indicates the amount of light that is present.

The HSV model closely resembles human perception of color and its components are similar to the artist's concept of tint, shade, and tone. The space in which these values are plotted can be shown by a pair of circular cones, as shown in FIG. 13. Moreover, the 3D representation of the HSV model is derived from the RGB model cube as is known in the art. However, the conversion from HSV to RGB is difficult to efficiently implement in a low-range embedded processor 50, especially if there are multiple independently controlled light sources 42 concurrently emitting light at various times, for various time periods, at varying intensities, and/or in various colors.

Referring to FIG. 14, one embodiment of the badge 10 is illustrated schematically in which the badge 10 is configured to efficiently shift a first color hue of light emitted from a light source 42 to a second desired color hue. At step 138, the color shift sequence is initiated. As described above, the illumination sequence may be initiated through a user interface 102 or through a light sensor. Alternatively, the illumination sequence may be initiated whenever a light disposed on the exterior portion of the vehicle 14 is placed in an illuminated state. Alternatively still, the illumination sequence may be initiated whenever a vehicle lighting system is initiated or whenever an engine of the vehicle 14 is initiated.

At step 140, the main hues are defined. According to one embodiment, the main hues include red, which can be expressed in the RGB color space as 1, 0, 0; yellow, which can be expressed in the RGB color space as 1, 1, 0; green, which can be expressed in the RGB color space as 0, 1, 0; cyan, which can be expressed in the RGB color space as 0, 1, 1; blue, which can be expressed in the RGB color space as 0, 0, 1; and purple, which can be expressed in the RGB color space as 1, 0, 1. However, in alternate embodiments any color model and/or any color hues may be utilized without departing from the teachings provided herein. For example, a cubic CMYK color model may be used in conjunction with or instead of the RGB color model described herein.

At step 142, a range of intensity levels of each color output from the light source 42 is defined. According to one embodiment, the range may correlate to the same number of light intensity levels described above if both methods are used in conjunction with one another. However, it will be appreciated that the range of intensity levels of each color output from the light source 42 may correspond to any practicable range that may be provided by the controller 46 configured to control the lighting operations of the badge 10. A pair of lookup tables having inverse shifting patterns from the first color hue to the second hue are defined by the number of desired intensity levels of each color output from the light source 42. According to one embodiment, 40 independent intensity levels may be utilized.

At step 144, an input is received that includes a desired second color hue. At step 146, the controller 46 determines whether the color shift from the first color hue to the second color hue is achieved by shifting the color in a clockwise direction in the color wheel of FIG. 13, for example shifting from red to purple. If so, the method continues to step 148, where a first lookup table is utilized. The first lookup table may include values for shifting the first color hue from red to purple. To accomplish this color shift, a plurality of color shifts may progressively or concurrently occur. To shift from red to yellow, green is increased from an intensity level of 0 towards 40. To shift from yellow to green, red is decreased from an intensity level of 40 towards 0. To shift from green to cyan, blue is increased from an intensity level of 0 towards 40. To shift from cyan to blue, green is decreased from an intensity level of 40 towards 0. To shift from blue to purple, red is increased from an intensity level of 0 towards 40. To shift from purple to red, blue is decreased from an intensity level of 40 towards 0.

If the color shift is not achieved by shifting the color in a clockwise direction, but in a counterclockwise direction, for example shifting from purple to red, a second lookup table is utilized at step 150. The second lookup table may include values for shifting the first color hue from purple to red. To accomplish this color shift, a plurality of color shifts may progressively or concurrently occur. To shift from purple, which is formed from a combination of red and blue both having an intensity level greater than 0, to red, red is decreased from an intensity level of 40 towards 0. To shift from blue to cyan, green is increased from an intensity level of 0 towards 40. To shift from cyan to green, blue is decreased from an intensity level of 40 towards 0. To shift from green to yellow, red is increased from an intensity level of 0 towards 40. To shift from yellow to red, green is decreased from an intensity level of 40 towards 0.

At step 152, the first or second lookup table is utilized for emitting the second color hue from the light source 42. Shifting from the first color hue to the second color hue may be accomplished by using the 40 mapped intensity levels that correlate to a linear perception of increases and decreases in emitted light intensity, as described above in reference to FIGS. 11 and 12.

The shifting from the first color hue to the second color hue is accomplished in a linear manner, as described above. The lookup table may be utilized to determine which of the RGB color hues to increase or decrease to accomplish a desired color. The linear movement occurs until the color hue reaches the end of the intensity ranges, which in regard to the above noted example, would be an intensity level of 40. The color value may also be concurrently and linearly adjusted with the hue. In some embodiments, the color values may be stored in a separate table that includes an independent range of intensity levels. For example, the color value lookup table may range from 0 to 5 and may be adjustable based on a linear perception, as described herein.

At step 154, the badge 10 monitors for the receival of a new input. If a new input is not received, a current light color may be continually emitted from the light source 42, the light source 42 may return to an unilluminated state, or the light source 42 may perform any other function. At step 156, the method ends.

Figure 15:
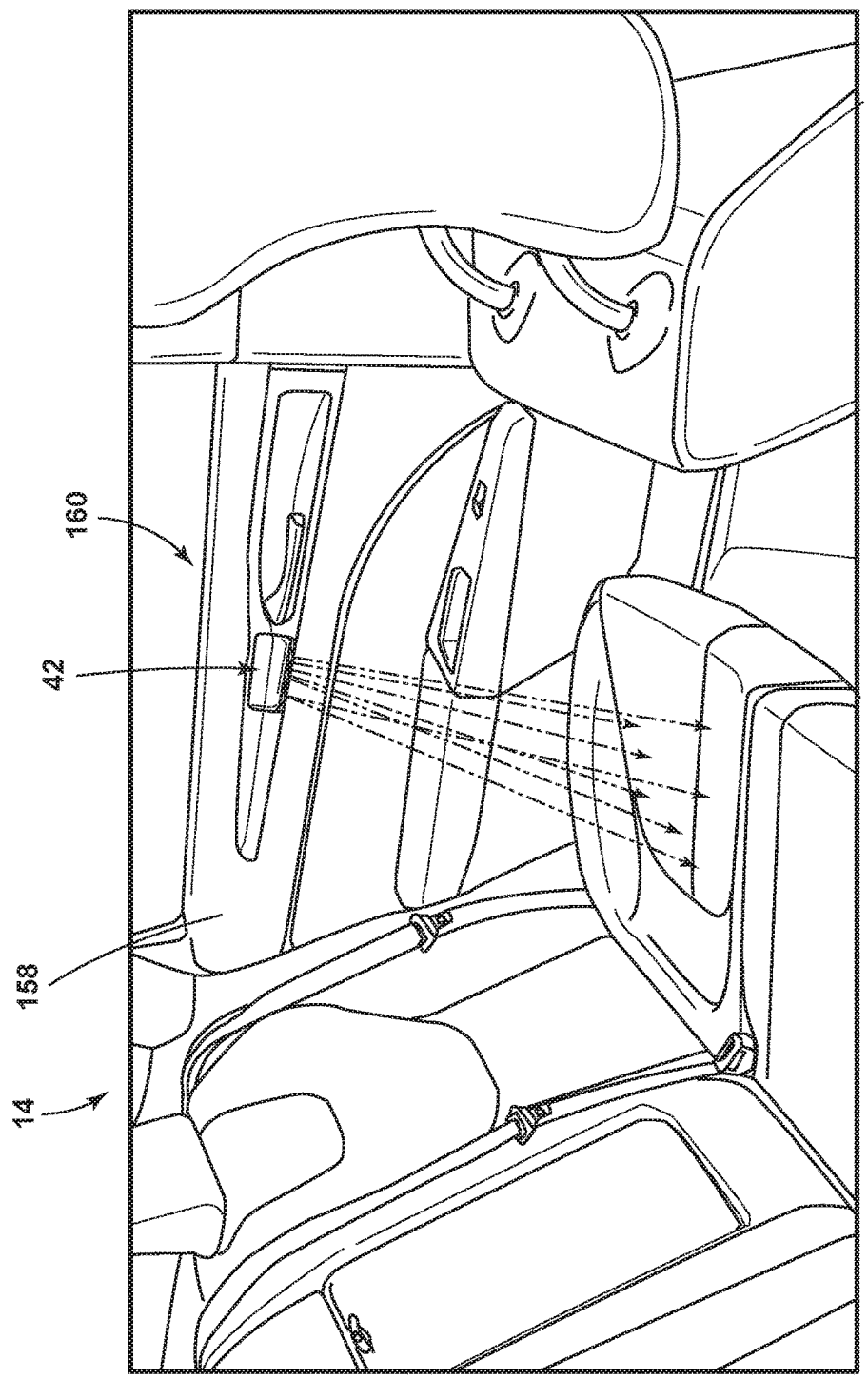
FIG. 15 is a perspective view of a vehicle interior showing a trim component therein having a light source that functions in conjunction with the illumination sequences described herein.

Referring to FIG. 15, an illuminated trim component 158 disposed within a cabin 160 of the vehicle 14 is illustrated. The trim component 158 may include one or more light source(s) 42 therein that function in conjunction with the illumination patterns described herein. For example, any light source 42 within the trim component 158 may illuminate at various times, for various time periods, at varying intensities, and/or in various colors. It will be appreciated that any illuminated component 158 disposed within the vehicle 14 may incorporate any of the features and/or illumination sequences provided herein without departing from the scope of the present disclosure.

According to various examples, a vehicle badge is provided herein. The vehicle badge includes one or more light sources emanating emitted light through a viewable portion. The vehicle badge also includes a controller configured to adjust at least one of an intensity or a color of the emitted light. An electric current signal value is independently output to each of the one or more light sources and is configured to alter the intensity or the color of emitted light from the one or more light sources in a linearly perceived illumination pattern. Examples of the vehicle badge can include any one or a combination of the following features:

the controller stores a number of predefined intensity levels in a lookup table and a range of electric current signal values is mapped to the number of predefined intensity levels based on the following relationship:

$$\left(\sqrt[2]{kL}\right)^3$$

where k is equal to a scaling coefficient that is determined by the number of desired parameters stored within the lookup table and L is a number of predefined intensity levels;

the controller stores a number of predefined intensity levels in a lookup table and a range of electric current signal values is mapped to a number of predefined intensity levels based on the following relationship:

$$e^{kL}-1$$

where k is equal to a scaling coefficient that is determined by the number of desired parameters stored within the lookup table, L is a number of predefined intensity levels, and e is Euler's number;

the controller increases the intensity of light emitted from each light source sequentially through each electric current signal value when the intensity of the one or more light sources is increased;

the light intensity of the one or more light sources emitted is varied over time;

at least one driver circuit operably coupled to the one or more light sources, and one of a transistor and a MOSFET connected in series with the at least one driver circuit;

at least one driver circuit operably coupled to the one or more light sources, and one of a logarithmic and an exponential amplifier disposed at an output of the at least one driver circuit;

the one or more light sources are disposed between a housing and a substrate;

a decorative layer disposed between an exterior surface of the housing and the one or more light sources;

the controller illuminates the one or more light sources at a predefined number of intensity levels that is less than the maximum electric current signal values possible of being generated by the controller; and/or a range of intensity levels of each color output from the one or more light sources correlates to the same number of the light intensity levels.

According to some examples, a vehicle badge is provided herein. The vehicle badge includes one or more light sources configured to emit light through a viewable portion. The vehicle badge further includes a controller configured to linearly adjust amongst varying color hues emitted from the one or more light sources. A decorative layer is disposed in front of the one or more light sources configured to control or modify an appearance of a viewable portion. Examples of the vehicle badge can include any one or a combination of the following features:

a predefined set of intensity levels are stored on the controller and wherein a predefined color space to determine a color of light emitted from the one or more light sources is also stored on the controller;

the color and intensity of light emitted from the one or more light sources is sequentially increased such that the intensity of light emitted from the one or more light sources is emitted in a linear pattern; and/or the controller stores a number of predefined intensity levels in a lookup table and a range of electric current signal values is mapped to the number of predefined intensity levels based on the following relationship:

$$\left(\sqrt[2]{kL}\right)^3$$

where k is equal to a scaling coefficient that is determined by the number of desired parameters stored within the lookup table and L is a number of predefined intensity levels.

According to other examples, a vehicle badge is provided herein. The vehicle badge includes a light source emanating emitted light through a viewable portion. The vehicle badge further includes a controller configured to adjust an intensity of the emitted light. An electric current signal value is output to the light source to alter the intensity of emitted light from the light source in a linearly perceived illumination pattern. Examples of the vehicle badge can include any one or a combination of the following features:

the variance between the current signal values is smaller at lower intensity levels and larger at higher intensity levels;

the controller is further configured to linearly adjust the emitted light of the light source amongst varying color hues emitted from the one or more light sources;

the controller stores a number of predefined intensity levels in a lookup table and a range of electric current signal values is mapped to the number of predefined intensity levels based on the following relationship:

$$\left(\sqrt[2]{kL}\right)^3$$

where k is equal to a scaling coefficient that is determined by the number of desired parameters stored within the lookup table and L is a number of predefined intensity levels; and/or the controller stores a number of predefined intensity levels in a lookup table and a range of electric current signal values is mapped to a number of predefined intensity levels based on the following relationship:

$$e^{kL}-1$$

where k is equal to a scaling coefficient that is determined by the number of desired parameters stored within the lookup table, L is a number of predefined intensity levels, and e is Euler's number.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle badge comprising:
    one or more light sources emanating emitted light through a viewable portion;
    a controller configured to adjust at least one of an intensity or a color of the emitted light, wherein an electric current signal value is independently output to each of the one or more light sources and is configured to alter the intensity or the color of emitted light from the one or more light sources in a linearly perceived illumination pattern; and
    at least one driver circuit operably coupled to the one or more light sources, and one of a logarithmic and an exponential amplifier disposed at an output of the at least one driver circuit.

2. The vehicle badge of claim 1, wherein the controller stores a number of predefined intensity levels in a lookup table and a range of electric current signal values is mapped to the number of predefined intensity levels based on the following relationship:

$$\left(\sqrt[2]{kL}\right)^3$$

where k is equal to a scaling coefficient that is determined by a number of desired parameters stored within the lookup table and L is a number of predefined intensity levels.

3. The vehicle badge of claim 1, wherein the controller stores a number of predefined intensity levels in a lookup table and a range of electric current signal values is mapped to a number of predefined intensity levels based on the following relationship:

$$e^{kL}-1$$

where k is equal to a scaling coefficient that is determined by a number of desired parameters stored within the lookup table, L is a number of predefined intensity levels, and e is Euler's number.

4. The vehicle badge of claim 1, wherein the controller increases the intensity of light emitted from each light source sequentially through each electric current signal value when the intensity of the one or more light sources is increased.

5. The vehicle badge of claim 1, wherein the light intensity of emitted light from the one or more light sources emitted is varied over time.

6. The vehicle badge of claim 1, wherein the one or more light sources are disposed between a housing and a substrate.

7. The vehicle badge of claim 6, wherein the badge further comprises:
    a decorative layer disposed between an exterior surface of the housing and the one or more light sources.

8. The vehicle badge of claim 1, wherein the controller illuminates the one or more light sources at a predefined number of intensity levels that is less than a maximum electric current signal value.

9. The vehicle badge of claim 8, wherein a range of intensity levels of each color output from the one or more light sources correlates to the same number of the light intensity levels.

10. A vehicle badge comprising:
    one or more light sources configured to emit light through a viewable portion;
    a controller configured to linearly adjust amongst varying color hues emitted from the one or more light sources; and
    a decorative layer disposed in front of the one or more light sources configured to control or modify an appearance of a viewable portion, wherein a predefined set of intensity levels are stored on the controller and wherein a predefined color space to determine a color of light emitted from the one or more light sources is also stored on the controller.

11. The vehicle badge of claim 10, wherein the color and intensity of light emitted from the one or more light sources are sequentially increased such that the intensity of light emitted from the one or more light sources is emitted in a linear pattern.

12. The vehicle badge of claim 10, wherein the controller stores a number of predefined intensity levels in a lookup table and a range of electric current signal values is mapped to the number of predefined intensity levels based on the following relationship:

$$\left(\sqrt[2]{kL}\right)^3$$

where k is equal to a scaling coefficient that is determined by a number of desired parameters stored within the lookup table and L is the number of predefined intensity levels.

13. A vehicle badge comprising:
    a light source emanating emitted light through a viewable portion; and
    a controller configured to adjust an intensity of the emitted light, wherein an electric current signal value is output to the light source to alter the intensity of emitted light from the light source in a linearly perceived illumination pattern, wherein the controller stores a number of predefined intensity levels in a lookup table and a range of electric current signal values is mapped to a number of predefined intensity levels based on the following relationship:

$$e^{kL}-1$$

where k is equal to a scaling coefficient that is determined by a number of desired parameters stored within the lookup table, L is a number of predefined intensity levels, and e is Euler's number.

14. The vehicle badge of claim 13, wherein the variance between the current signal values is smaller at lower intensity levels and larger at higher intensity levels.

15. The vehicle badge of claim 13, wherein the controller is further configured to linearly adjust the emitted light of the light source amongst varying color hues emitted from the one or more light sources.

16. The vehicle badge of claim 13, wherein the controller stores a number of predefined intensity levels in a lookup table and a range of electric current signal values is mapped to the number of predefined intensity levels based on the following relationship:

$$\left(\sqrt[2]{kL}\right)^3$$

where k is equal to a scaling coefficient that is determined by a number of desired parameters stored within the lookup table and L is a number of predefined intensity levels.

* * * * *